A. W. HEANY.
Hay Rake and Loader.

No. 55,098.

Patented May 29. 1866.

Witnesses.

Inventor

UNITED STATES PATENT OFFICE.

A. W. HEANY, OF DOYLESTOWN, PENNSYLVANIA.

IMPROVEMENT IN MACHINES FOR RAKING AND LOADING HAY.

Specification forming part of Letters Patent No. 55,098, dated May 29, 1866.

*To all whom it may concern:*

Be it known that I, A. W. HEANY, of Doylestown, in the county of Bucks and State of Pennsylvania, have invented a new and Improved Hay Raking and Loading Device; and I do hereby declare that the following is a full, clear, and exact description thereof, which will enable those skilled in the art to make and use the same, reference being had to the accompanying drawings, forming part of this specifiation, in which—

Figure 1:
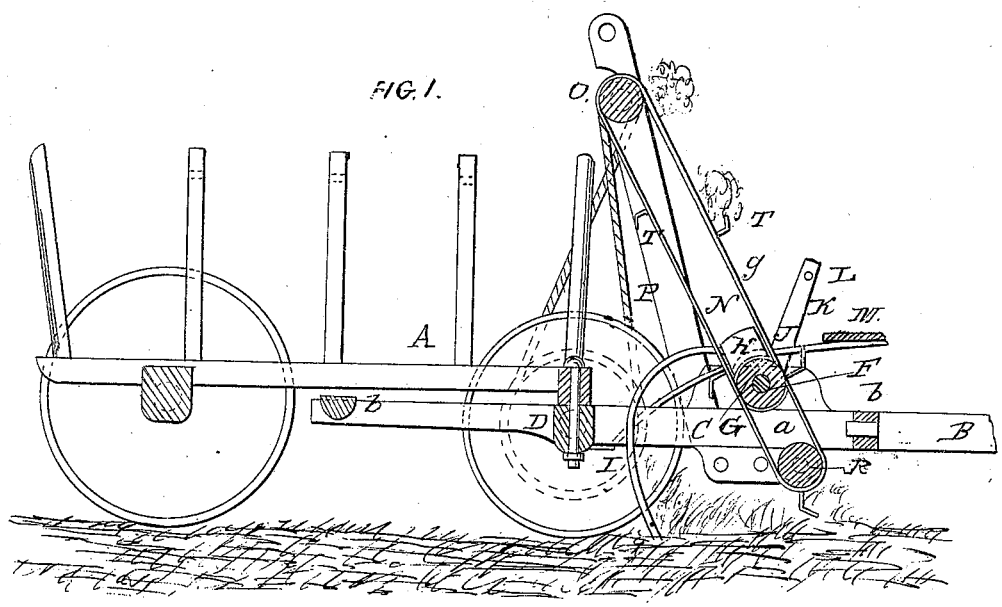
Figure 2:
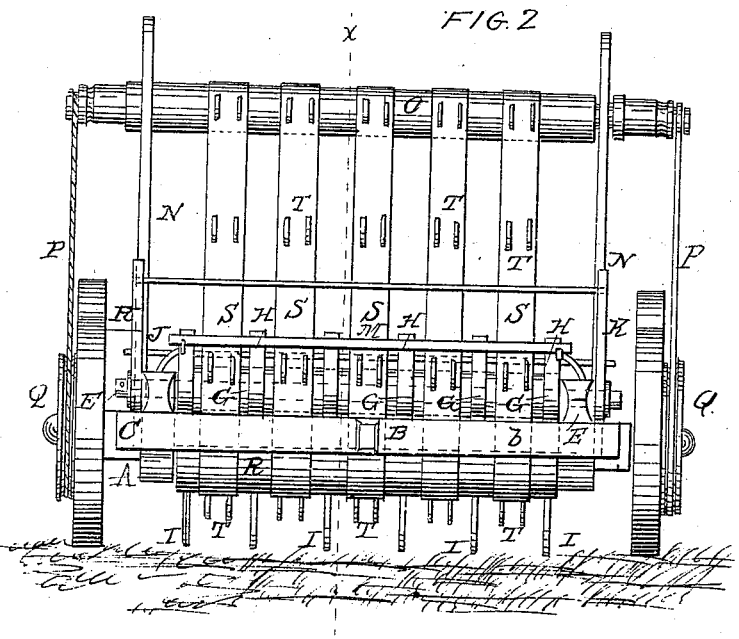

Figure 1 is a side sectional view of my invention, taken in the line $x\ x$, Fig. 2; Fig. 2, a front elevation of the same.

Similar letters of reference indicate corresponding parts.

This invention relates to a new and improved device for raking and loading hay, the same being designed to be applied to a wagon, so that the latter will be loaded direct as it is drawn along over the field.

The invention consists in the employment or use of a rake and an elevator constructed, arranged, and applied to a wagon substantially as hereinafter shown and described, whereby the work may be done in a perfect manner and with a great saving in time and labor.

A represents a wagon, which may be constructed in any manner suitable for carrying hay, and B is the draft-pole attached to a framing, C, on the front axle, D, of the wagon, said framing being of rectangular form and composed of two parallel bars, $a\ a$, connected by cross-bars $b\ b$.

On the bars $a\ a$ of the framing C there are placed blocks, E E, which are allowed to slide freely for a certain distance on said bars, and F is a shaft or rod, the ends of which are fitted in the blocks E E. On this shaft or rod F there are fitted loosely a series of pulleys, G, and between these pulleys, on the rod F, there are placed heads H, to which rake-teeth I are attached, said teeth being constructed of wire curved or bent similar to the teeth of a horse-rake.

The heads H are all connected by a rod, J, which passes through them, and has its ends fitted in arms K K, which are placed loosely on the ends of the shaft or rod F, a rod, L, connecting the outer ends of the arms K K. This rod L is in the rear of the driver's seat M, and the driver, by pressing back against the rod L, may throw the teeth I down to their work, or, by pulling said rod forward, raise the teeth so as to render the same inoperative.

To each bar $a$ of the framing C there is attached an inclined support, N, in the upper parts of which a shaft, O, is fitted and allowed to rotate freely, said shaft being rotated by cross-belts P from pulleys Q, attached to the wheels of the front axle.

R is a shaft, which has its bearings in the lower parts of the blocks E E, and S represents a series of straps which pass over the shafts R O and have teeth T attached to them, said teeth being of bent form, as shown clearly in Fig. 1.

The operation is as follows: As the machine is drawn along the rake-teeth I gather up the hay, and the teeth T of the straps S take up the hay from the teeth I and carry it upward and discharge it over the shaft O into the wagon or upon the load thereon. The hay will disengage itself from the teeth I. It will, in fact, from the momentum it receives from the movement of the straps S, be thrown toward the rear of the wagon. The shaft O is placed sufficiently high to admit of the wagon being loaded to the desired height. When the wagon is loaded the driver shoves the blocks E E backward, which loosens the straps S and prevents them from operating. The rake-teeth I are also thrown up free from the ground, and the loaded wagon may then be drawn to the barn or to the place where the hay is to be stacked.

The device is extremely simple, composed of but few parts.

The advantages this machine possesses over others for the same purpose consist, first, in the direct attachment of the hay-loading mechanism to the wagon and the placing of the former in front of the latter. By this arrangement the windrows (when the hay is raked up from windrows) do not serve as an obstruction to the wagon, and the windrows are not leveled down and the hay scattered by the wagon, as is the case where the hay-loading mechanism is at the rear of the wagon. Besides this advantage another one is obtained, which consists in a reduction of draft, and also another, consisting in placing the hay-loading mechanism under the complete control of the driver.

When said mechanism is at the rear of the wagon it is beyond the reach of the driver or any attendant whatever. The wagon must be stopped in case any particular manipulation is required.

By my arrangement the wagon and loading mechanism are rendered far more compact than usual, and the device may be constructed at a less cost.

I do not confine myself to the use of wire teeth I for the rake, for wooden teeth may be employed and connected to the heads H on the rod J by means of pivots, and I would remark that instead of having a series of straps S for the elevator, one broad belt may be used.

Having thus described my invention, I claim as new and desire to secure by Letters Patent—

1. The arrangement of the frame C, shafts R F O, heads H, teeth I, rearwardly-inclined rotating straps S, and teeth T, all located at the front of a wagon, and operating in the manner and for the purposes set forth.

2. The heads H, rod J, and arms K K, connected by a rod, L, in connection with the driver's seat, M, all arranged to operate in the manner substantially as and for the purpose set forth.

A. W. HEANY.

Witnesses:
J. H. KRATS,
J. F. HANEY.